United States Patent [19]
Deziel

[11] 4,084,547
[45] Apr. 18, 1978

[54] SAFE START CHECKING LIQUID PROCESSING SYSTEM

[75] Inventor: Frederick T. Deziel, Bloomington, Minn.

[73] Assignee: Honeywell Inc., Minneapolis, Minn.

[21] Appl. No.: 669,777

[22] Filed: Mar. 24, 1976

[51] Int. Cl.² .............................................. F22B 37/42
[52] U.S. Cl. .................................. 122/504; 219/333; 340/244 C
[58] Field of Search .................. 236/21 R; 137/392; 122/504; 73/304 R; 219/333 X; 340/244 C

[56] References Cited

U.S. PATENT DOCUMENTS

| 3,109,415 | 11/1963 | Rowell | 122/504 |
| 3,834,357 | 9/1974 | Kaczmarek et al. | 122/504 |
| 4,007,713 | 2/1977 | De Leonardis et al. | 122/504 |

*Primary Examiner*—William E. Wayner
*Attorney, Agent, or Firm*—Alfred N. Feldman

[57] ABSTRACT

A self checking system is disclosed in various forms, and is specifically shown as applied to a system which checks the level of water in a boiler before an associated fuel burner system is initiated. Before the liquid or water in the system can be processed, the liquid level is either caused to be depressed or is simulated as depressed, and this depression in the liquid level is sensed and the level verified before a circuit is completed in the liquid processing system.

12 Claims, 4 Drawing Figures

FIG. I

SAFE START CHECKING LIQUID PROCESSING SYSTEM

BACKGROUND OF THE INVENTION

In liquid processing system, such as boilers and their associated fuel burners, it is substantially essential that the level of the water in the system be verified prior to the initiation or lighting of the fuel burner. The failure to have water present in a boiler at the time the fuel burner is ignited obviously creates an unsafe condition that can either damage the boiler, or possibly even cause an explosion with more extensive damage and possible loss of life.

While the present description is particularly directed to boilers and their associated burners, the problem of verifying the level of a liquid before initiation of processing of the liquid is becoming more and more important due to automation and the safety requirements involved. Boilers generally use water level sensing devices which rely upon float operated switches, resistance type probes, and similar equipment which can fail indicating the presence of water when none is present. Since much of the present equipment is now operating through automated process controls and fuel burner controls, more and more electronic components and circuitry are also being used. This type of circuitry is also subject to unsafe types of failures. A relatively simple means of verifying the liquid level or system circuitry prior to the initiation of the process or burner in a boiler is, therefore, becoming more and more necessary.

SUMMARY OF THE INVENTION

The present invention, while applicable to any type of liquid processing system, is specifically disclosed as being applied to a boiler containing water and the ultimate control of a fuel burner for that boiler. The present invention specifically is directed to the concept of either causing the boiler water to drop below the desired minimum level, or to be simulated as dropping below the desired minimum level, and then being sensed at its proper level. This cycle of loss of fluid level and the restoration of fluid level is sensed by a fluid sensor and circuitry prior to each startup of the process or fuel burner.

The first versions of the present invention disclosed are directed to a safe start checking system for a boiler wherein the water in a small reservoir connected to the boiler is allowed to be drained and this draining is sensed by a water level sensor. When the water is sensed to have dropped a specified amount, the drain to the reservoir is closed. The reservoir is very small in volume as compared to the boiler and the loss of water is insignificant. The loss of water, however, cycles the water level sensor and this cycling is programmed through an electric circuit which will then allow the initiation of the fuel burner system.

The invention is the last configuration disclosed, utilizes a boiler that does not require draining but has an inherently safe type of water or liquid level sensor and the cycling that is accomplished checks the electronics in the associated amplifier connected to the inherently safe sensor. The invention of the present application when applied to an inherently type sensor, such as that disclosed in the United States patent application Ser. No. 618,857, filed on Oct. 2, 1975 now U.S. Pat. No. 4,027,172, and entitled "Resistive Fluid Detecting Means" completes an inherently safe liquid processing system that does not require the use of a liquid reservoir or draining means. The depression in the liquid level is simulated by an opening and closing of one of the electric circuits and thereby allows the checking of the subsequent electronic amplifier in the system.

BRIEF DESCRIPTION OF THE DRAWINGS

FIG. 1 is a schematic representation of a boiler and a liquid reservoir means;

DESCRIPTION OF THE PREFERRED EMBODIMENTS

Figure 1A:
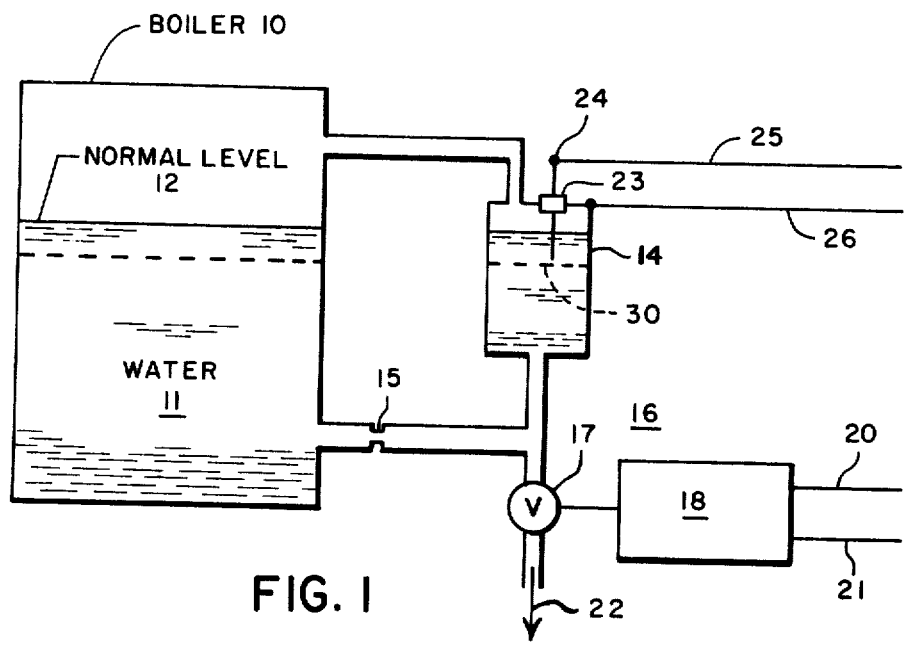
FIG. 1a is the electrical circuitry that is combined with FIG. 1 to complete the system.
Figure 1A:
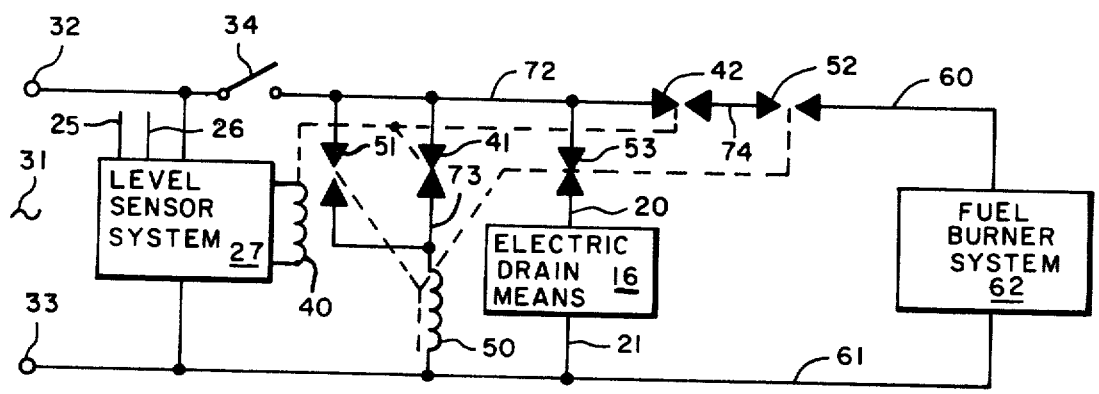

In FIGS. 1 and 1a a complete liquid processing system is disclosed. The liquid processing system is more specifically disclosed as a boiler 10 having water 11 to a normal level 12. The boiler 10 has as part of its structure a liquid reservoir means 14 with the liquid reservoir means including an orifice 15 to restrict the flow of water from said boiler 10 when an electric drain means 16 is activated. The electric drain means 16 is made up of a valve 17 and an operator 18 which is connected by conductors 20 and 21 to the electrically portion of the system disclosed in FIG. 1a. The valve 17 drains water at 22 and this water can be disposed of either through a conventional drain or can be returned to the boiler 10 by means of a pump (not shown).

Disposed in the top of the liquid reservoir means 14 is an insulating member 23 with a probe 24 that extends into the water 11. The probe 24 is connected by conductor 25 to the level sensor system 27. The outer case of the liquid reservoir means 14 is connected by conductor 26 to the liquid level sensor system 27, and the probe 24 along with the level sensor system 27 form a conventional type of resistive water probe liquid level or water level sensor used in many boiler installations.

As will be explained in some detail later, when the valve 17 is opened in response to the actuator 18, water drains from the liquid reservoir 14 at a relatively rapid rate without having but a minimal effect on the water 11 in the boiler 10. As soon as the probe 24 clears the water at level 30, the level sensor system 27 responds and the electric actuator 18 closes the valve 17. At this point, the water 11 seeks its normal level 12 completing the circuit through the probe 24 once again. The manner in which this cycling is accomplished and is utilized will be brought out after FIG. 1a is described in detail.

Electric power is supplied at 31 to a pair of conductors 32 and 33 to the level sensor system 27 and a controller 34 that is closed when the liquid processing system is to be initiated, as when a fuel burner is to be ignited for the boiler 10. The liquid level sensor system 27 has for its output a relay 40 which includes normally closed contact means 41 and normally open contact means 42. With water connecting the probe 24 and the conductor 26, the level sensor system 27 keeps the relay 40 energized. A further relay 50 including a normally open pair of contacts 51 and a normally open pair of contacts 52, along with a normally closed pair of contacts 53 completes electric circuitry to a pair of conductors 60 and 61 which are connected to a fuel burner system 62. The relay 50 and its contacts form a latching type of switching means. The fuel burner system 62 completes the liquid processing system in the case of a boiler.

It will be noted that upon the closure of switch 34, that a circuit is completed through the relay contacts 53 to the electric drain means 16. The electric drain means 16 immediately causes the valve 17 to open draining water from the liquid reservoir means 14. As soon as the water level reaches the level 30, a circuit is interrupted between the probe 24 and the conductor 26 which causes the liquid level sensor system 27 to deenergize the relay 40. The relay 40 closes the contacts 41 and opens the contacts 42. The contacts 41, immediately upon closing, energize the relay 50. The relay 50 has a latching means of contacts 51 which latches the relay 50 into an energized condition. At this same time the electric drain means 16 is deenergized by the contacts 53 opening and the latching circuit is prepared to energize the fuel burner system 62 by the contacts 52 closing.

Once this sequence of events occurs, the valve 17 has closed due to the opening of the contacts 53 and the water level in the water reservoir 14 rises to complete a circuit between the probe 24 and the conductor 26. This causes the liquid level sensor system 27 to energize the relay 40 thereby opening contacts 41 (which is now paralleled by the closed contacts 51) and closing the contacts 42. This completes an energizing control circuit means for the fuel burner system 62, and the fuel burner can then start its normal operation.

It can thus be seen that before the fuel burner system 62 can be initiated, the water in the liquid reservoir means 14 must drop below the end of the probe 24 and return to complete a circuit through the probe 24 to cycle the relay contacts of the relays 40 and 50 in such a manner as to latch in the relays in a complete circuit to the fuel burner system 62.

In the event that insufficient water is present at the initial startup, or during the burner operation the relay 40 is deenergized which will energize the relay 50 but will hold open the circuit at contacts 42. The present system requires that the fluid be cycled at each startup with a complete electric circuit from the probe 24 to the conductor 26, to the point of breaking that circuit, and than reestablishing that circuit before the relays 40 and 50 will cycle in order to complete an electric circuit through the contacts 42 and 52 to the fuel burner system 62.

It can thus be seen that a liquid processing system has been provided that verifies at the beginning of each cycle that the liquid or water for the system is present and is at a proper level. In FIGS. 1 and 1a a system utilizing the very simplest and very common water sensing probe has been disclosed. The type of water sensor is not material to the present invention. The type of cycle and sequence of contact means is essential. While the contact means have been shown as relay contacts, it is possible that parts of the circuit 1a could be replaced by solid state switching means without departing from the spirit of the inventive cycle required to verify the presence of liquid prior to the beginning of the processing of that liquid in the system.

Figure 2:
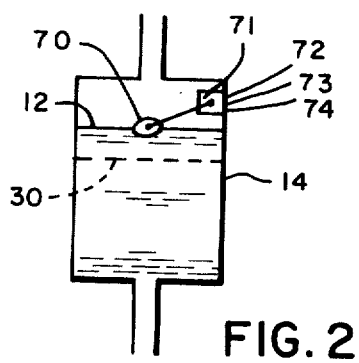
FIG. 2 is an alternate liquid level sensor.

In FIG. 2 a second type of liquid level or water level sensor is disclosed. The liquid reservoir means 14 is again disclosed containing a liquid but in this case a float means 70 operating a switch means 71 is disclosed. The switch means 71 contains the normally closed contact means 41 and the normally open contact means 42 and could be wired directly into the circuit disclosed in FIG. 1a. A conductor 72 is the common conductor 72 of FIG. 1a while conductor 73 is the conductor 73 of FIG. 1a between the contacts 41 and the relay means 50, and the conductor 74 is the conductor between the contacts 42 and 52. Therefore, in the case of the float type mechanism of FIG. 2, the liquid level sensing system 27 and the relay 40 would be replaced by the simple float operated switch means 71 having the same contact means 41 and 42 as disclosed in FIG. 1a.

It thus becomes apparent that any type of liquid level or water level sensing means which has normally open contacts and normally closed contacts can be used with the present invention and that the invention resides, therefore, in the sequence of operation of the elements as disclosed in FIGS. 1 and 1a.

Figure 3:
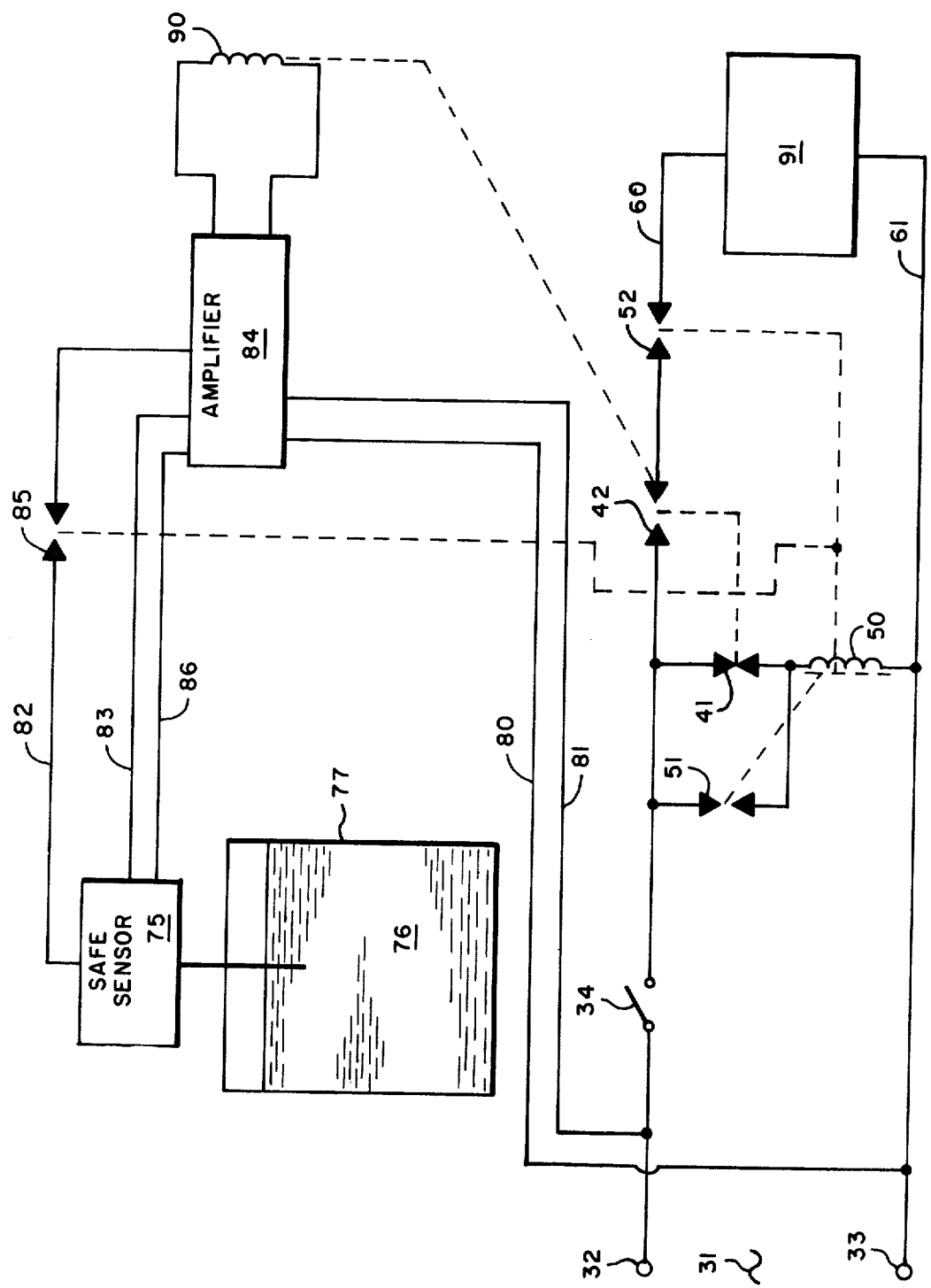
FIG. 3 is a liquid processing system utilizing an inherently safe liquid level sensor.

In FIG. 3 a liquid processing system is disclosed wherein the need for the liquid reservoir means 14 of FIG. 1 is disposed of, and wherein the type of sensor used is an inherently safe type of sensor. An inherently safe type of sensor 75 is disclosed and is of the type fully explained in U.S. Pat. No. 4,027,172 and entitled "Resistive Fluid Detecting Means". This earlier filed application on an inherently safe fluid sensor is assigned to the assignee of the present invention. The inherently safe sensor 75 can detect the absence of a fluid and can also detect a short circuit across the sensor's elements which simulate the presence of fluid. By being able to differentiate between these two different conditions, the sensor 75 is inherently safe and will sense the liquid 76 in the system undergoing processing in container 77. The inherently safe system, comprising sensor 75 and amplifier 84 is connected by conductors 80 and 81 to the source of power 31 on conductors 32 and 33 of a circuit very similar to that disclosed in FIG. 1a. Once again a control switch 34 has been disclosed which supplies power to the balance of the system.

The inherently safe sensor 75 has three conductors 82, 83 and 86 between the sensor 75 and the amplifier 84. A pair of normally open relay contacts 85 are placed in conductor 82 so that the amplifier 84 can be made to believe that a low liquid level is present in container 77 when the contacts 85 are open. In the system of FIG. 3, no liquid reservoir means and drain are provided but the low liquid condition is simulated by the opening of the contacts 85, as will be explained in more detail below. The amplifier 84 has an output relay 90. The relay 90 has contact means 41 and 42 in the same manner that the liquid level sensing system 27 and its relay 40 had contact means 41 and 42. Once again, the relay 50 and its normally open contacts 51 along with the normally open contacts 52 are provided. Also, operated by relay 50 are the normally open pair of contacts 85. The circuit again has conductors 60 and 61 which are connected to a liquid processing system element 91 that is initiated after the level of the liquid has been established as being safe.

The operation of FIG. 3 is as follows. With the switch 34 open, the amplifier means 84 is caused to believe that the liquid 76 is below its proper level in the container 77 by contacts 85 being open. This causes the relay 90 to be deenergized by the amplifier means 84 and the contact means 41 and 42 are thereby as shown. The contact means 41 of the relay 90 are closed while the contact means 42 are open. Upon closing switch 34, the closed contacts 41 energize the relay 50 which immediately latches itself in by means of the contacts 51. The contacts 52 then also close but since the contacts 42 are open, the power is not applied to the system element 91 of the liquid processing system. The closing of relay 50, however, closes contacts 85. Upon the contacts 85 closing, the amplifier means 84 will sense fluid if fluid is present at the safe sensor 75 at a level that has been preestablished by the insertion of the safe sensor 75. This will immediately cause the amplifier means 84 to energize the relay 90 at which time the contact means 41 opens and contact means 42 will close. Since the contacts 52 have been latched into a closed state, power will be available on conductor 60 and 61 to energize the system element 91 of the liquid processing system.

In the disclosure of FIG. 3, the inherently safe sensor 75 is used as a means of checking the electronics in the amplifier 84 by simulating the absence of liquid due to the open contact 85 each time the system is called on to operate. If the simulated low liquid level is sensed and the contact 85 closes, the amplifier means 84 is allowed to pull-in the relay 90 thereby completing the energizing circuit for the balance of the process. With the arrangement of FIG. 3 it is unnecessary to dump or dispose of any of the liquid contained in the processing system and could be highly advantageous in systems that do not use water but use some other, more expensive or more difficulty handled liquid. The system, however, provides a very simple safe start check of the amplifier used in a liquid level system wherein the inherently safe sensor 75 is used.

In the present application three possible approaches to the unique sequence of verifying the level of a liquid have been disclosed. This technique of operation could be applied to numerous physical embodiments and the applicant has shown only three such embodiments. The scope of the present invention is, however, limited solely by the scope of the appended claims.

The embodiments of the invention in which an exclusive property or right is claimed are defined as follows:

1. A liquid processing system which verifies the proper condition of the system prior to the initiation of the processing of a liquid, including: liquid level sensing means having at least two contact means; a first of said contact means being open circuited upon the indication of said liquid being at a level at which said processing is desired to be initiated and close circuited upon an indication of said liquid being below said level; a second of said contact means being close circuited with said liquid indicated as at said level and open circuited with said liquid indicated as below said level; switching means energized by said first contact means being close circuited to indicate said liquid is below said level; said switching means latching itself into said energized state upon once being energized; and said switching means further including control circuit means in electrical series with said second contact means to complete an energizing circuit to initiate the processing of the liquid upon said liquid being at said level after the operation of said switching means.

2. A liquid processing system as described in claim 1 wherein said switching means includes a relay having a normally open contact which closes upon operation of said relay to latch said relay into an energized state; and said control circuit means being a second normally open contact controlled by said relay.

3. A liquid processing system as described in claim 2 wherein said liquid level sensing means includes a liquid level sensor system having a second relay which operates said two contact means; one of said contact means being a normally open contact of said second relay; and the other of said contact means being a normally closed contact of said second relay.

4. A liquid processing system as described in claim 3 wherein said liquid processing system is adapted to include liquid reservoir means connected to said liquid processing system and wherein said reservoir means has a small volume compared to said system; said reservoir means including electrically operated drain means to lower the level of the liquid in said reservoir means while having a minimal effect upon the liquid level in said liquid processing system; said liquid level sensing means being responsive to the liquid level of said reservoir means; and said first relay having a normally closed contact connected to said electrically operated drain means to deenergize said drain means upon said first relay becoming energized to thereby close said drain means.

5. A liquid processing system as described in claim 4 wherein said liquid processing system is a boiler and a fuel burner system with said liquid being water; and said contacts of said relays being adapted to complete an energizing circuit for said fuel burner system upon said water level being verified by said liquid level sensing means being cycled each time said boiler fuel burner system is initiated.

6. A liquid processing system as described in claim 5 wherein said liquid level sensing means includes a water sensing probe system to control said second relay.

7. A liquid processing system as described in claim 2 wherein said liquid processing system is adapted to include level reservoir means connected to said liquid processing system and wherein said reservoir means has a small volume compared to said system; said reservoir means including electrically operated drain means to lower the level of the liquid in said reservoir means while having a minimal effect upon the liquid level in said liquid processing system; said liquid level sensing means including a float responsive to the liquid level of said reservoir means to operate said two contact means; and said relay means having a normally closed contact connected to said electrically operated drain means to deenergize said drain means upon said relay becoming energized to thereby close said drain means.

8. A liquid processing system as described in claim 7 wherein said liquid processing system is a boiler and a fuel burner system with said liquid being water; said two contact means of said liquid level sensing means completing an energizing circuit for said fuel burner system upon said water level being verified by said level sensing means being cycled each time said boiler fuel burner system is initiated.

9. A liquid processing system as described in claim 2 wherein said liquid level sensing means includes amplifier means having input connection means connected to sensing element means; said amplifier means further connected to control said two contact means; and said input connection means including a third normally open contact which is operated by said relay; said third normally open contact causing said liquid level sensing means to respond as if said sensing element means failed to sense a liquid in said liquid processing system.

10. A liquid processing system as described in claim 9 wherein said sensing element means includes an inherently safe liquid sensor that responds to the absence of liquid or a short circuited sensing element as if no liquid is present.

11. A liquid processing system as described in claim 10 wherein said amplifier means includes a relay to operate said two contact means.

12. A liquid processing system as described in claim 11 wherein said liquid is water and said processing system includes a boiler; and said relays are adapted to energize a fuel burner system in response to the presence of water being verified by said level sensing means being cycled each time said fuel burner system is initiated.

* * * * *